Oct. 22, 1968       H. FRUEHAUF ETAL       3,407,345
VARIABLE DELAY WINDSHIELD WIPER SYSTEM
Filed Aug. 31, 1964

INVENTORS
HUGO FRUEHAUF
DENNIS W. SHANFELDT
BY Anderson, Spangler & Wymore
ATTORNEYS

United States Patent Office 3,407,345
Patented Oct. 22, 1968

3,407,345
VARIABLE DELAY WINDSHIELD WIPER SYSTEM
Hugo Fruehauf, 559 S. Fairfax, Glendale, Colo. 80222, and Dennis W. Shanfeldt, 3620 Paulina Ave., Chicago, Ill. 60613
Filed Aug. 31, 1964, Ser. No. 393,192
5 Claims. (Cl. 318—443)

ABSTRACT OF THE DISCLOSURE

A variable delay switching system comprising a relaxation oscillator driven transistor switch connected to maintain the switch open while the oscillator is in the non-energized or quiescent state and momentarily close the switch when the oscillator is in the energized or fired state wherein the length of the time interval that the oscillator is de-energized is selectively variable.

---

The use of electric motor driven windshield wipers is almost universal in today's modern automobile. Under different driving conditions, where precipitation is encountered, it may be desirable to operate the windshield wipers at a speed best suited to remove the precipitation from the driver's vision with the minimum interference with the driver's attention and observance of the road. To this end, the automobile manufacturers in addition to supplying the standard one-speed wipers, for an extra charge will supply a deluxe two or even three speed wiper which, in addition to the standard high speed, will have a lower speed for use when the precipitation is light.

The normal practice for a two or more speed windshield wiper is to use a two speed motor having several windings. Such motors are more expensive than single speed motors. A serious drawback in using a wiper motor at reduced speeds is that the wiper blades tend to chatter in moving across the windshield and fail to provide adequate removal of the precipitation.

It is the principal object of the present invention to provide an improved multi-speed windshield wiper system which avoids one or more of the disadvantages of prior art devices.

A further object of the invention is to provide an improved multi-speed windshield wiper system wherein use is made of a single speed motor.

A still further object of the present invention is to provide a multi-speed control for attachment and control of existing single or multi-speed wipers.

Another and further object of the present invention is to provide an improved multi-speed windshield wiper system having high windshield cleaning capabilitiy even at low speeds and is inexpensive, rugged, easily serviced and readily added to present single speed windshield wiper systems.

In accordance with the invention, the variable delay windshield wiper switching system capable of providing multi-speed operation with a single speed motor comprises an electric motor operatively connected to a windshield wiper, a source of electric current connected to said motor switch means and means to periodically interrupt the flow of current through the switch for a predetermined interval of time.

For a better understanding of the present invention, together with other and further objects thereof, reference is had to the following description taken in connection with the accompanying drawing and its scope will be pointed out in the appended claims.

Figure 1:
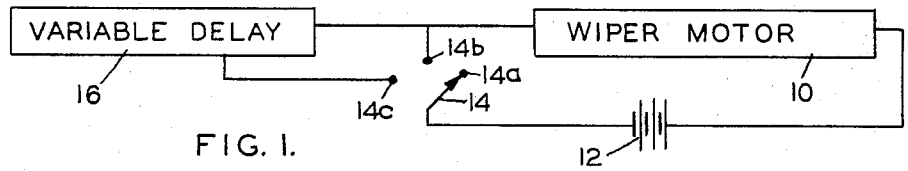
FIGURE 1 is a block diagram of the circuitry of a windshield wiper system embodying the present invention.

In accordance with the present invention, windshield wiper speed control is accomplished through variable delay ON-OFF switching of the windshield wiper motor. The switching may be conveniently accomplished by means of a relaxation type oscillator with variable OFF delays. Referring to FIGURE 1 of the present invention, there is represented in block form a windshield wiper motor 10 and a source of electrical current 12 in the form of a battery and switch 14 adapted to interconnect the motor and the battery. When the movable contact of switch 14 is positioned on contact 14a, the motor is disconnected from battery 12. Positioning the movable contact to contact 14b connects the battery directly to the motor. Positioning the movable contact to contact 14c connects the battery to the motor 10 through a variable delay 16 which periodically interrupts the flow of current through switch 14 to motor 10. Most present day electric windshield wiper motors require only a momentary closure of the switch and they will operate through a complete cycle before stopping even though the switch is immediately opened. With this in mind, it will be seen that in most instances only the OFF period need be variable although the ON period could be made variable within the teaching of the invention. The variable delay 16 may conveniently be a relaxation type oscillator with variable ON and OFF delays. The oscillator cyclically provides an ON pulse which may be used as a trigger pulse to actuate an electronic switch or a relay to provide for a one cycle wiper sweep with variable OFF periods or variable delays between ON periods. One practical design provides 2, 4, 7 and 10 seconds OFF delay periods between ON periods. The duration of the ON period is selected to be sufficient to start the wiper motor through one cycle of their operation and reset by means of a conventional reset mechanism. A relay or a transistor can be used to provide the actual power switching to a positive or negative source as required.

Figure 2:
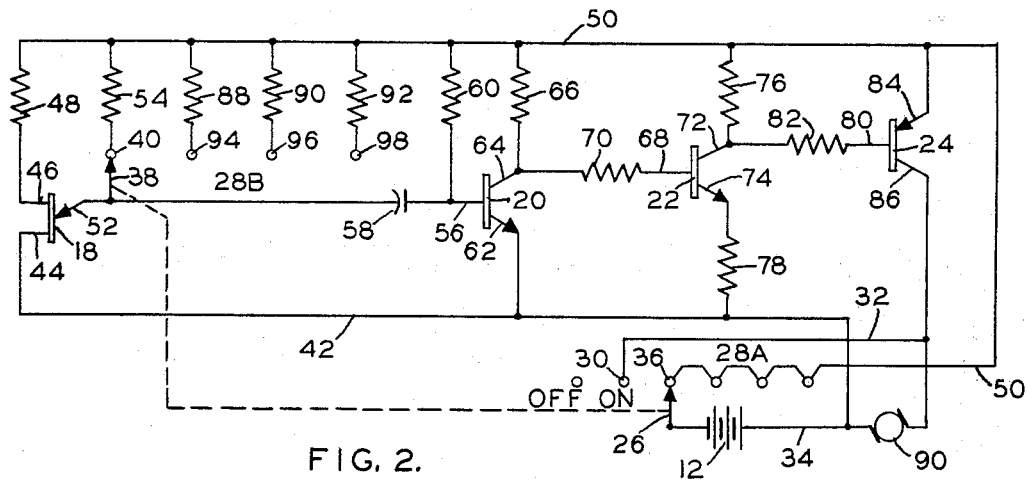
FIGURE 2 is a schematic diagram of one embodiment of the present invention.

Referring to FIGURE 2, it will be seen that the oscillator includes a unijunction transistor and an NPN switching transistor 20 with associated components. Transistor 22 is also an NPN switching transistor which serves as an inverter stage for PNP power switching transistor 24. When the wiper arm 26 of switch 28A is moved to the ON contact 30, a current path is completed from the positive terminal of battery 12, through arm 26, contact 30, via conductor 32 to motor 10 and to the negative terminal of the battery 12 via conductor 34. This provides normal operation of the windshield wipers driven by motor 10.

On moving wiper arm 26 of switch 28A to contact 36, through a mechanical linkage, wiper arm 38 of switch 28B is moved into contact with contact 40, a circuit is completed from the negative terminal of battery 12 via conductors 34 and 42 to the base connection 44 of transistor 18. The other base connection 46 is connected to the positive terminal of the battery via resistor 48, conductor 50, contact 36, and wiper arm 26 of switch 28A. Resistor 48 serves to temperature stabilize the oscillator circuit. The emitter 52 of transistor 18 is connected to conductor 50 and to the positive terminal of battery 12 via resistor 54. Additionally, emitter 52 is capacity coupled to the base 56 of transistor 20 via capacitor 58 and base 56 is connected to conductor 50 via resistor 60. The emitter 62 of transistor 20 is connected directly to conductor 42 and negative terminal of battery 12 and the collector 64 thereof is connected to conductor 50 via resistor 66.

The transistor 18 is in the normally de-energized state with the normal low current flowing through base 44, base 46 and resistor 48. With resistor 54 switched into the circuit the flow of base current through transistor 20 will bias the transistor into saturation. In this state, the emitter 62 to collector 64 voltage is reduced to a very low value on the order of less than 100 millivolts. The base 68 of transistor 22 is connected to the collector 64 of transistor 20 serially through resistor 70 and the base current of transistor 22 is limited to the point where transistor 22 is cut-off. In the cut-off state the voltage from collector 72 to emitter 74 is approximately that of the battery 12, the collector being connected through resistor 76 and emitter through resistor 78. In this state, the voltage across resistor 76 is less than about 100 millivolts reducing the base current of transistor 24 to the point of cut-off. The collector 72 of transistor 22 is connected to the base 80 of transistor 24 via resistor 82. In the cut-off state, the impedance between emitter 84 and collector 86 is sufficiently high to substantially prevent any current flow through motor 10 and the windshield wipers are stopped.

The wipers will remain stopped until transistor 18 fires when capacitor 58, which has been charging through the emitter 62 and base 56 of transistor 20 and resistor 54, reaches trigger voltage of transistor 18. Capacitor 58 being charged applies a voltage producing an impedance break-down between emitter 52 and base 44 of transistor and the capacitor discharges to the negative side of battery 12 due to transistor 18 displaying a negative impedance characteristic where the impedance between base 44 and emitter 52 drops to a low value. As capacitor 58 discharges through transistor 18, the base current through transistor 20 is reduced essentially to zero. With no emitter to base current flowing transistor 20 goes into a cut-off state and the voltage drop between emitter 62 and collector 64 thereof rises from almost zero to a substantial potential. With the high potential being applied to the base 68 of transistor 22, base current flows through resistors 70 and 78 sufficient to drive transistor 22 into saturation. With transistor 22 being saturated, the impedance in the base current path of transistor 24 is lowered allowing current to flow through resistor 78, emitter 74, collector 72 and resistor 82 and base 80 to emitter 84. The flow of base current in transistor 24 biases transistor 24 into saturation where the impedance between emitter 84 and collector 86 thereof is reduced to a very low value on the order of less than about 0.5 ohm permitting motor 10 to be energized for a one cycle sweep.

Capacitor 58 continues to discharge through transistor 18 until the potential presented to the emitter 52 is insufficient to keep transistor 18 in the low impedance state. The impedance across the emitter 52 and base 44 of transistor 18 rises to its normally high value with reinitiation of the charging cycle of condenser 58. The circuit is thus returned to the steady state condition until condenser 58 charges to the trigger potential.

The OFF interval of wiper motor 10 is a direct function of the time required for condenser 58 to charge to the trigger potential. The charging time is controlled by the value of resistance 54 and thus to provide predetermined varied charging times, a series of resistors 88, 90 and 92 are provided connected between conductor 50 and contacts 94, 96 and 98 of switch 28B. By switching in higher order of resistances, the charging interval can be lengthened and thus, the off-time of the wiper motor is increased.

Figures 4, 5:
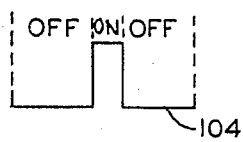
Figures 6, 7:
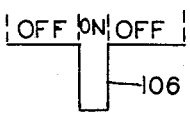

Referring now to the curves of FIGURES 4 through 7, curve 100 of FIGURE 4 illustrates the approximate wave form of the voltage appearing at the emitter 52 of transistor 18 as condenser 58 charges the firing potential and the rapid discharge of condenser 58 through emitter 52 and base 44 of transistor 18. Curve 102 of FIGURE 5 illustrates the approximate wave form of the voltage appearing at the base 56 of transistor 20. Curve 104 of FIGURE 6 illustrates the approximate voltage wave form appearing at the collector of transistors 20 and 24. Curve 106 of FIGURE 7 illustrates the approximate wave form of the voltage appearing at the collector of transistor 22.

Figure 3:
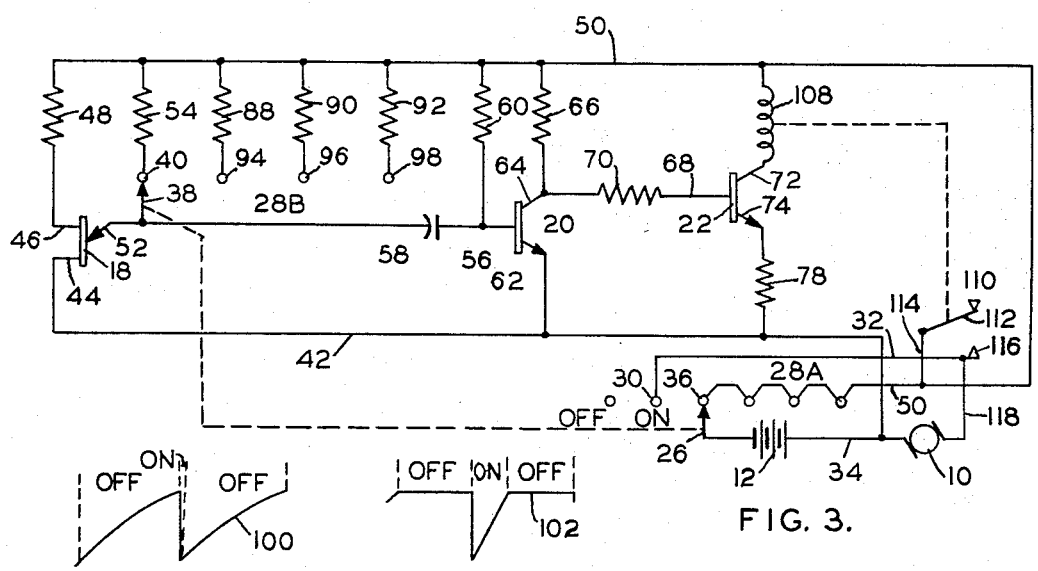
FIGURE 3 is a schematic representation of still another embodiment of the invention; and, FIGURES 4, 5, 6 and 7 represent approximate wave forms depicting operating characteristics of the circuit of FIGURES 2 and 3.

Referring now to the embodiment of the invention shown in FIGURE 3, it will be seen that the circuit of the oscillator including transistors 18 and 20 is identical to the circuit of FIGURE 2 and the same description and reference numerals apply. Transistor 22 which functions as an inverter stage in the circuit of FIGURE 2 functions as a driver for a relay in FIGURE 3. In FIGURE 3, transistor 24 and associated components are deleted and the actuating coil 108 of relay 110 is substituted for the resistor 76 connected to the collector of transistor 22. Relay 110 has the movable armature 112 connected to the positive terminal of the battery 12 via conductor 114, conductor 50, switch contacts 36 of switch 28A and wiper arm 26 thereof. Relay contact 116 is connected to the wiper motor via conductor 118.

In operation, the wipers are placed in the normal operating state when arm 26 of switch 28A is positioned on contact 30. When the wiper arm 26 is placed on contact 36, and arm 38 on contact 40, power is applied to the circuit and resistor 54 is placed in the oscillator circuit. With power applied to the circuit, sufficient base current will flow to bias transistor 20 into saturation. In this the emitter to collector voltage of transistor 20 is quite low and limits the base current of transistor 22 to the point that transistor 22 is in the cut-off state. In this state, the emitter to collector voltage of transistor 22 is approximately that of the supply 12. With a low voltage across the coil 108, relay 110 is unactuated and motor 10 remains de-energized.

The circuit will remain in this steady state condition until transistor 18 fires. This occurs when capacitor 58, which charges through the emitter to base junction of transistor 20 and resistor 54, is charged to a potential at which the base 44 to emitter 52 break-down occurs in transistor 18. At this point, transistor 18 displays a negative impedance characteristic and the normally high impedance between base 44 and emitter 52 drops to a low value. Capacitor 58 begins to discharge through base 44 to emitter 52 reducing the normal base current in transistor 20 to zero. In the absence of base current transistor 20 goes into cut-off and the emitter 62 to collector 64 voltage drop increases applying a high potential to base 68 of transistor 22. With this high potential, base current starts to flow through resistors 66, 70 and 78 sufficient to drive transistor 22 into saturation. The emitter 74 to collector 72 voltage of transistor 22 drops and the current flow through coil 108 energizes relay 110 closing armature 112 and contact 116 to complete a current path through motor 10 to start the wipers for one cycle of operation.

Condenser 58 continues to discharge, FIGURE 4, until the point is reached where transistor 18 goes into the de-energized state at which time the base 44 to emitter 52 impedance rises to its normally high value, whereupon, the charging of capacitor 58 resumes. The charging interval of capacitor 58 will depend upon the value of resistor 54. By switching to resistors 88, 90 or 92 of increasing resistance, the charging interval, or off time, will be lengthened. The wiper ON time, of course, will be determined by the discharge interval of capacitor 58.

It will be appreciated that the described circuits are for illustration only and other circuit arrangements are contemplated to be within the scope of the invention. Of the circuits shown, the embodiment using the transistor 24 for power switching provides excellent reliability and long life and initial low cost. However, there will always be a small amount of resistance in series with the wiper motor 10 as the collector to emitter impedance of transistor 24 is in series therewith which may amount to about 0.5 ohm even at saturation. Where this impedance is a significant factor, the relay may be used to advantage, since as the relay contacts close, no additional resistance is added to the load.

While there have been described what at present are considered to be the preferred embodiments of the invention, it will be obvious to those skilled in the art that various changes and modifications may be made therein without departing from the invention. It is aimed, therefore, in the appended claims to cover all such changes and modifications which fall within the true spirit and scope of the invention.

It will be appreciated that the delay switching means may comprise a timer switching means other than an electronic means such as, an electric motor and the like. Other arrangements will occur to those skilled in the art which are within the scope of the present invention.

What is claimed is:

1. An improved windshield wiper system which comprises in combination:
    an electric motor operatively connected to a windshield wiper,
    a source of electric current,
    switch means including a control transistor for selectively interconnecting the source of current to said motor, and,
    delay means to automatically and cyclically delay the closure of said switch for a predetermined time interval wherein said delay means consists of a relaxation oscillator operatively connected to said control transistor to cause the transistor to be cut off opening said switch means when the relaxation oscillator is in the normal deenergized state and momentarily closing said switch means upon the lapse of a predetermined time interval resulting from the relaxation oscillator being energized driving the control transistor into saturation.

2. An improved windshield wiper system which comprises in combination:
    an electric motor operatively connected to drive a windshield wiper,
    a source of electric current,
    electric switch means on closure interconnecting said source with said motor including control transistor means, and,
    delay means comprising oscillator means for periodically closing said electric switch means for a time interval sufficient to permit the wiper system to complete one cycle of operation and said means further being adapted to open said switch means for a predetermined selected time interval wherein said delay means consists of a relaxation oscillator including a uni-junction transistor operatively connected to said control transistor to cause the transistor to be cut off opening said switch means when the relaxation oscillator is in the normal de-energized state and momentarily closing said switch means upon the lapse of a predetermined time interval resulting from the relaxation oscillator being energized driving the control transistor into saturation.

3. The combination of claim 1 in which the switch means consists of a transistor actuated between a conductive condition and a nonconductive condition by said control transistor and said relaxation oscillator includes a transistor having an emitter electrode and constructed to generate a continuous energy output connected for maintaining said switch means normally in the nonconductive condition, charge storage means connected to the emitter electrode of said oscillator adapted to be charged at various predetermined rates and to discharge through said oscillator periodically disrupting the energy output therefrom causing said switch means to transfer momentarily to the conductive condition.

4. The combination of claim 3 wherein the oscillator transistor is a uni-junction transistor.

5. The combination of claim 2 in which the switch means consists of a transistor actuated between a conductive condition and a nonconductive condition by said control transistor and said relaxation oscillator includes a transistor having an emitter electrode and constructed to generate a continuous energy output connected for maintaining said switch means normally in the nonconductive condition, charge storage means connected to the emitter electrode of said oscillator adapted to be charged at various predetermined rates and to discharge through said oscillator periodically disrupting the energy output therefrom causing said switch means to transfer momentarily to the conductive condition.

References Cited

UNITED STATES PATENTS

| | | | |
|---|---|---|---|
| 3,219,901 | 11/1965 | Foreman et al. | 318—443 |
| 3,262,042 | 7/1966 | Amos | 318—443 |
| 2,968,770 | 1/1961 | Sylvan | 307—88 |

ORIS L. RADER, *Primary Examiner.*

J. J. BAKER, *Assistant Examiner.*